United States Patent [19]

Graham et al.

[11] Patent Number: 4,914,530

[45] Date of Patent: Apr. 3, 1990

[54] MEDIA DEFECT MANAGEMENT WITHIN DISK DRIVE SECTOR FORMAT

[75] Inventors: Randolph H. Graham, Fremont; Dennis W. Hollenbeck, Santa Clara, both of Calif.

[73] Assignee: Plus Development Corporation, Milpitas, Calif.

[21] Appl. No.: 98,913

[22] Filed: Sep. 21, 1987

[51] Int. Cl.[4] .............................................. G11B 5/09
[52] U.S. Cl. ........................................ 360/48; 360/49; 360/50
[58] Field of Search ................ 360/48, 49, 50; 369/59

[56] References Cited

U.S. PATENT DOCUMENTS 3,997,876 12/1976 Frush .................................... 360/50

Primary Examiner—Vincent P. Canney

Attorney, Agent, or Firm—David B. Harrison

[57] ABSTRACT

In a rotating disk drive for storing and retrieving data used by a host system computer, a narrow gap is provided within a data sector format for each concentric data track of the drive. This gap may be normally located at the end of the track, in a speed tolerance buffer region following the last sector. In the event a media defect is detected which otherwise falls within a NAR area for a particular sector, this gap may be shifted to the beginning of the data track, thereby shifting all of the sectors and their NAR areas backward by the width of the gap. The media defect otherwise falling into the NAR area of a particular sector then falls harmlessly into a data field of a preceding sector, and this preceding sector may then be read and mapped out of service by insertion of a spare sector within the physical track without any loss of user data storage capability.

16 Claims, 5 Drawing Sheets

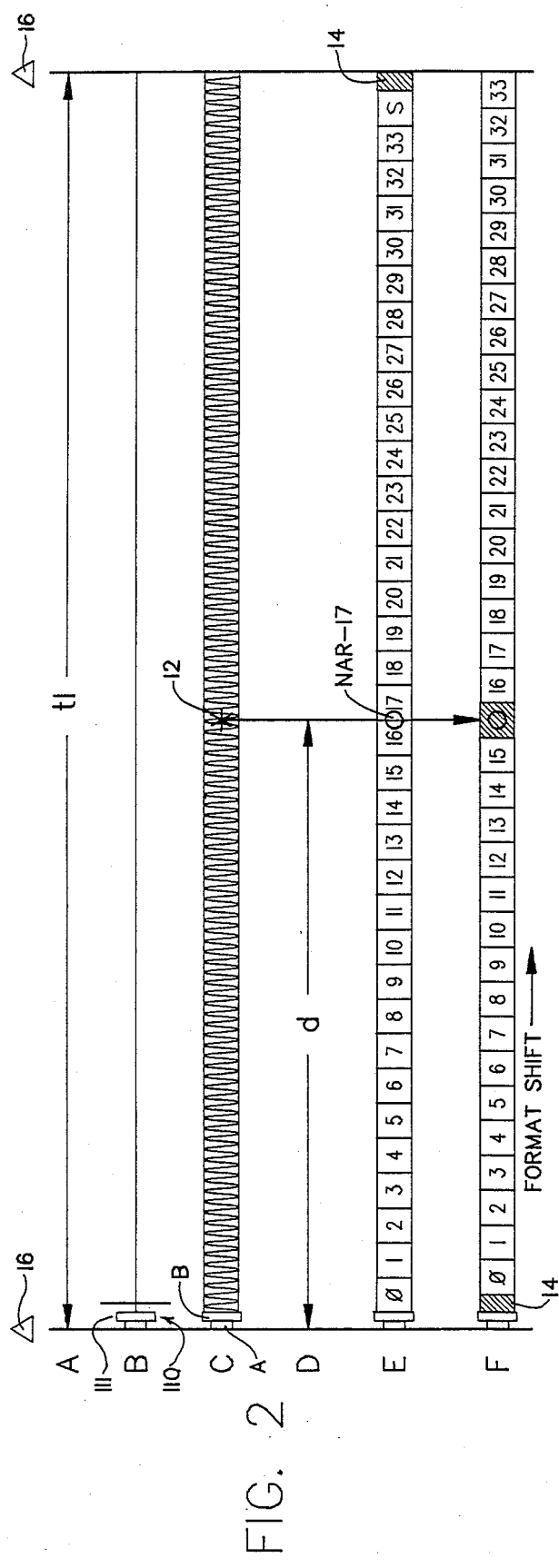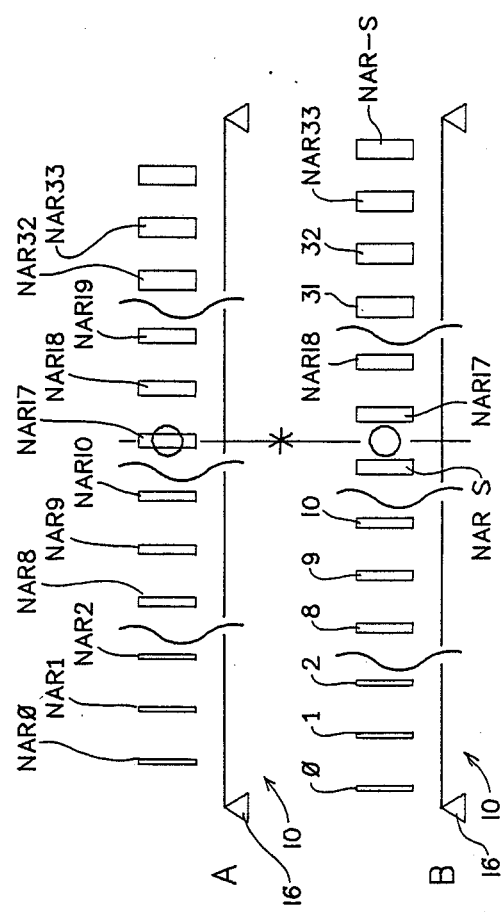
FIG. 2
FIG. 1

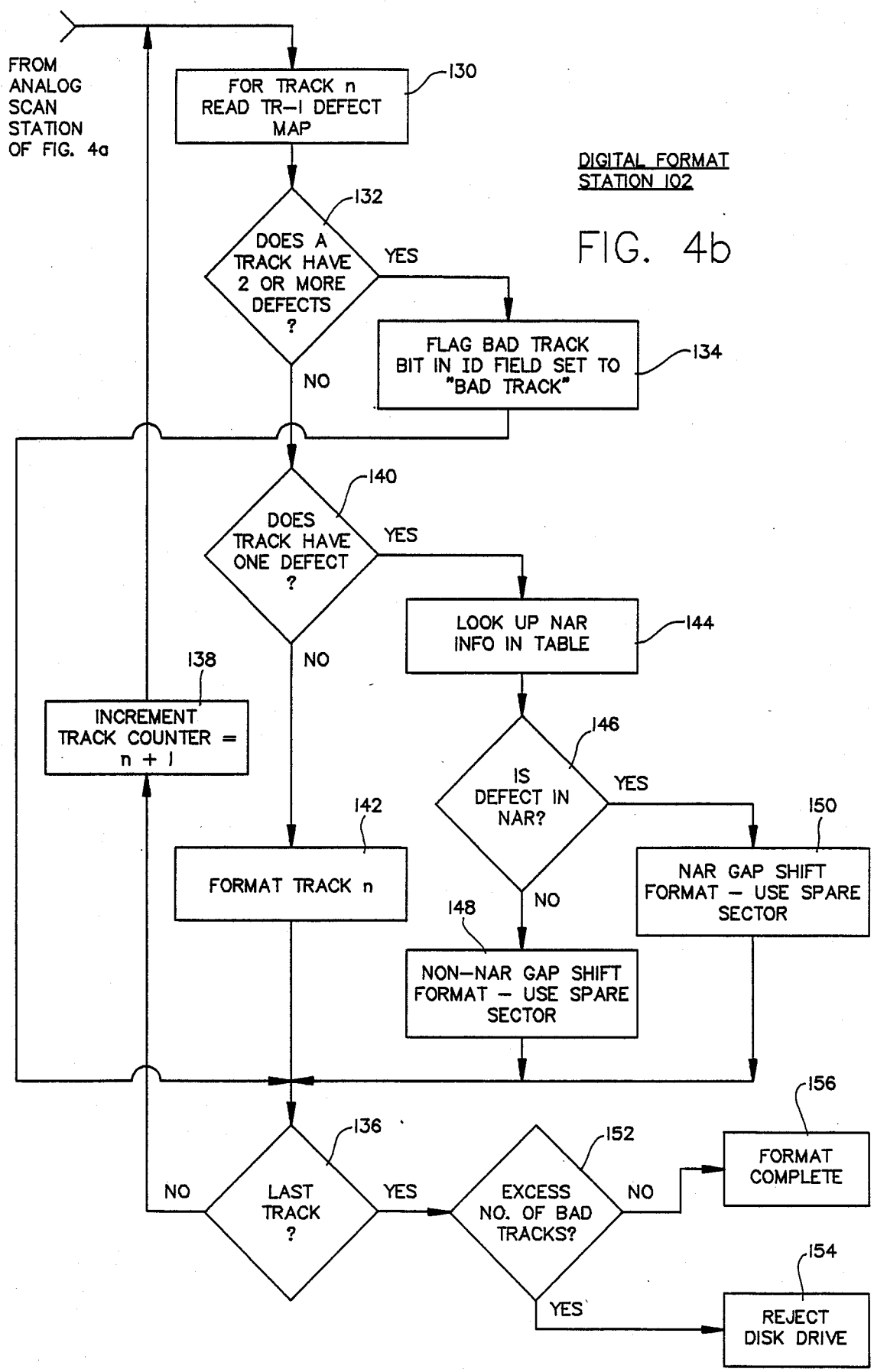

MEDIA DEFECT MANAGEMENT WITHIN DISK DRIVE SECTOR FORMAT

FIELD OF THE INVENTION

The present invention relates to a method for avoiding defects located in the recording medium within a disk drive data storage system. More particularly, the present invention relates to a method for shifting a predetermined data sector format of a data track by a predetermined amount in order to move a media defect from a critical area of a data sector into an area that may be mapped out of use.

BACKGROUND OF THE INVENTION

Disk drives are one type of peripheral storage devices commonly employed within digital computing systems. Such drives have the advantage of considerable storage capability and reasonably rapid random access to blocks of information stored on the data storage surface of a rotating disk within the drive.

While manufacturing processes and techniques for making magnetic data storage disks have improved dramatically, such processes still result in the production of magnetic data storage disks having a certain number of defects in the magnetic medium forming the data storage surface. The defects may be minute pinholes, or asperities caused by failures of the coating, plating, or sputtering processes used to apply the medium to the disk surface or by the embedding of foreign particles in the coating, etc. Whatever the cause or characteristic, a defect is a physical characteristic of a data storage disk which interferes with and even prevents the storage of useful information at the situs thereof.

While magnetic data storage disks usually are characterized by a multiplicity of concentric data tracks, it is known, particularly with optical disk data storage, to use a single spiral track. Whether a single spiral track, or a multiplicity of concentric tracks ar defined, subdivision of the track or tracks into predetermined segments of finite duration, called "sectors" is a general convention. Typically, a concentric data track of a fixed disk drive may include 17 data sectors, with each sector capable of containing a certain amount of user data, such as 512 bytes. Each sector also includes certain overhead information which is needed by the disk drive subsystem for proper operation, but which is unavailable to the user. This overhead typically includes a sector preamble containing information for flagging the beginning of the sector to the disk drive controller and for identifying the sector, typically by cylinder number, head (surface) number, and sector number. One typical arrangement of data within a sector is set forth in FIG. 20 of commonly owned U.S. Pat. No. 4,639,863, the disclosure of which is hereby incorporated by reference.

Immediately preceding the sector identification data is a unique signaling arrangement or pattern we refer to as an "address marker sequence". The address marker sequence typically includes a constant pattern multibyte preamble, a sync byte, and an address mark byte. The controller constantly looks for this address marker sequence whenever data is being read back from the data surface. The controller requires this information to establish phase lock to the data rate and then to recover the data located in the sector, including the sector identification data.

Since the only way available to the controller to find a sector of interest is to read its address marker sequence, it is very important that no media defects be located within the nominal address marker sequence region and the immediately following sector identification field. Herein, this area of each sector is defined as the non-assignable region ("NAR"), and there is a NAR for each sector within each track on every data surface of the disk drive. This NAR includes the nominal address marker sequence region, and it is further increased by a margin which is related to spindle speed tolerance, index drift and analog media test equipment defect location accuracy. The required margin is a function of the worst case, and spindle speed tolerance typically varies from a small value (e.g. 5 bytes) to a large value (e.g. 150 bytes) as the distance of the sector location extends away from a fixed reference point, such as a spindle index clocking signal put out once each revolution of the disk. Thus, in this example the worst case is 150 bytes, and this value becomes the controlling margin.

So important has been the need not to encounter a defect within a NAR that the prior practice has been to map out an entire data track if it contains a single defect, irrespective of its location. Thus, in the instance of one media defect, elimination of a 17 sector data track containing the defect results in loss of 8704 bytes of data storage capability. More recently, the inclusion of a spare sector within each track has enabled reduction of the number of full tracks lost, but the swapping of a spare sector for a data sector has been possible only in those situations wherein a media defect did not fall into a NAR. If a single media defect lay in a NAR, the entire track was lost, since it would not be possible to read the sector identification data and know that this sector is to be skipped over, and the spare sector substituted in its place.

While data tracks having 17 sectors have become a de facto industry standard for small computing systems, such as the IBM Personal Computer TM, for example, the data storage capability within a data track has increased, to the point that it is practical now to include as many as two full 17-sector logical tracks within a single physical track. This approach is taken in an increased data storage capacity disk file subsystem developed under the aegis of the assignee of the present invention and as set forth in U.S. patent application Ser. No. 07/052,709, filed on May 20, 1987, for "Modular Unitary Disk File Subsystem Having Increased Data Storage Capacity", the disclosure of which is hereby incorporated by reference.

Another prior art approach, which is described in U.S. Pat. No. 3,997,876, calls for the placement of a special gap in the data track directly over the defect in a manner which will then be transparent to the storage system. However, this approach required a considerable overhead of special electronics circuitry and further required data storage overhead within the data track in terms of a defect field in each sector which was read in order to locate the special gap thereby to ignore it. Also, the placement of a special gap over the defect raised the possibility of timing errors during data recovery operations with a conventional disk drive controller, since a suspension of data signals from the disk during the gap may cause the phase locked oscillator in the data separator circuit of the controller to lose synchronism.

A hitherto unsolved need has arisen for an improved method for shifting a predetermined data track soft sectored format by a predetermined amount in order move a media defect from a NAR into an area that may be mapped out of use.

SUMMARY OF THE INVENTION WITH OBJECTS

It has been discovered by applicants in practice that approximately ninety percent (90%) of media defects detected by applicants' assignee during media quality testing are single defects within a track; and these defects are capable of being managed and compensated for by a unique mechanism for moving such single defects out of NAR regions, so that the swapping of a single spare sector within the track for a sector containing the defect greatly enhances yields of disk drive products.

Therefore, a general object of the present invention is to provide a method for managing storage media defects in a disk drive in a manner which overcomes limitations and drawbacks of the prior art.

A more specific object of the present invention is to provide a simplified method for adjusting placement of a data format for a data track in a manner which moves media defects out of NAR areas, thereby enabling a spare sector to be substituted for the sector containing the defect.

Another object of the present invention is to provide a simplified method for managing media defects during the manufacture of fixed disk drives.

A further object of the present invention is to provide an analog scan defect map on an otherwise unused data track of the disk drive which may subsequently be accessed during manufacture, or even by the user, to discover the location of previously discovered media defects and then to take appropriate stems to manage such defects so that they do not fall into NAR areas.

One more object of the present invention is to provide a unique soft sectored format for each data track of a disk drive.

Yet another object of the present invention is to eliminate or greatly reduce the numbers of bytes actually reported to the computer as lost to the disk operating system upon encountering a single media defect within a track during a disk format operation carried out by the operating system.

In accordance with the principles of the present invention, a narrow gap is provided within the data sector format for each concentric data track of a disk drive. For example, this gap may be located normally at the end of the track format, in a speed tolerance buffer gap region following the last sector. In the event of a media defect otherwise falling within a NAR area for a particular data sector, this gap is shifted to a new location, such as the beginning of the data track, with the result that all of the sectors and their NAR areas are shifted backward by the length of the gap. The media defect otherwise falling into the NAR area of a particular sector now falls harmlessly into a data field of a preceding sector, and this preceding sector now containing the defect in its data field may be read and mapped out of service by insertion of a spare sector within the physical track without any loss of user data storage capability.

These and other objects, advantages and features of the present invention will be more fully understood and appreciated upon considering the following detailed description of a preferred embodiment, presented in conjunction with the accompanying drawing.

BRIEF DESCRIPTION OF THE DRAWINGS

In the Drawings:

FIG. 1 containing of A and B is a diagram of a truncated physical data track. In FIG. 1A, the track is shown as containing a media defect within a NAR area of a data sector. In FIG. 1B the track format has been shifted a predetermined amount in order now to place the defect outside of the NAR area of the sector, in accordance with the principles of the present invention.

FIG. 2A though F is a diagram of a physical data track of predetermined duration and data storage capability.

FIG. 2A illustrates unformatted physical track length (t1) of the track between internal index clock markers.

FIG. 2B shows the placement of a track centerline servo burst pattern in a servo region immediately following the index clock.

FIG. 2C shows the track being recorded with an analog carrier signal following the centerline servo burst field.

FIG. 2D represents a time/distance measurement (d) from the leading index clock marker to a media defect.

FIG. 2E illustrates that with a conventional format process (NAR gap is at the end of the track in the speed tolerance buffer), the defect would otherwise appear in a non assignable region (NAR-17) within a header of the physical sector number 17.

FIG. 2F illustrates that the entire track format of the track has been shifted in time and space by placement of the NAR gap at the beginning of the track, thereby shifting the defect out of a non-assignable region and into a data field, in accordance with the principles of the present invention.

FIGS. 4A and 4B together comprise a flowchart for a manufacturing process which implements the principles of the present invention, FIG. 4A illustrating the operational steps of an analog scan station, and FIG. 4B illustrating the operational steps of a digital format station, both being within the manufacturing facility.

DETAILED DESCRIPTION OF A PREFFERED EMBOMDIMENT

Figure 3A:
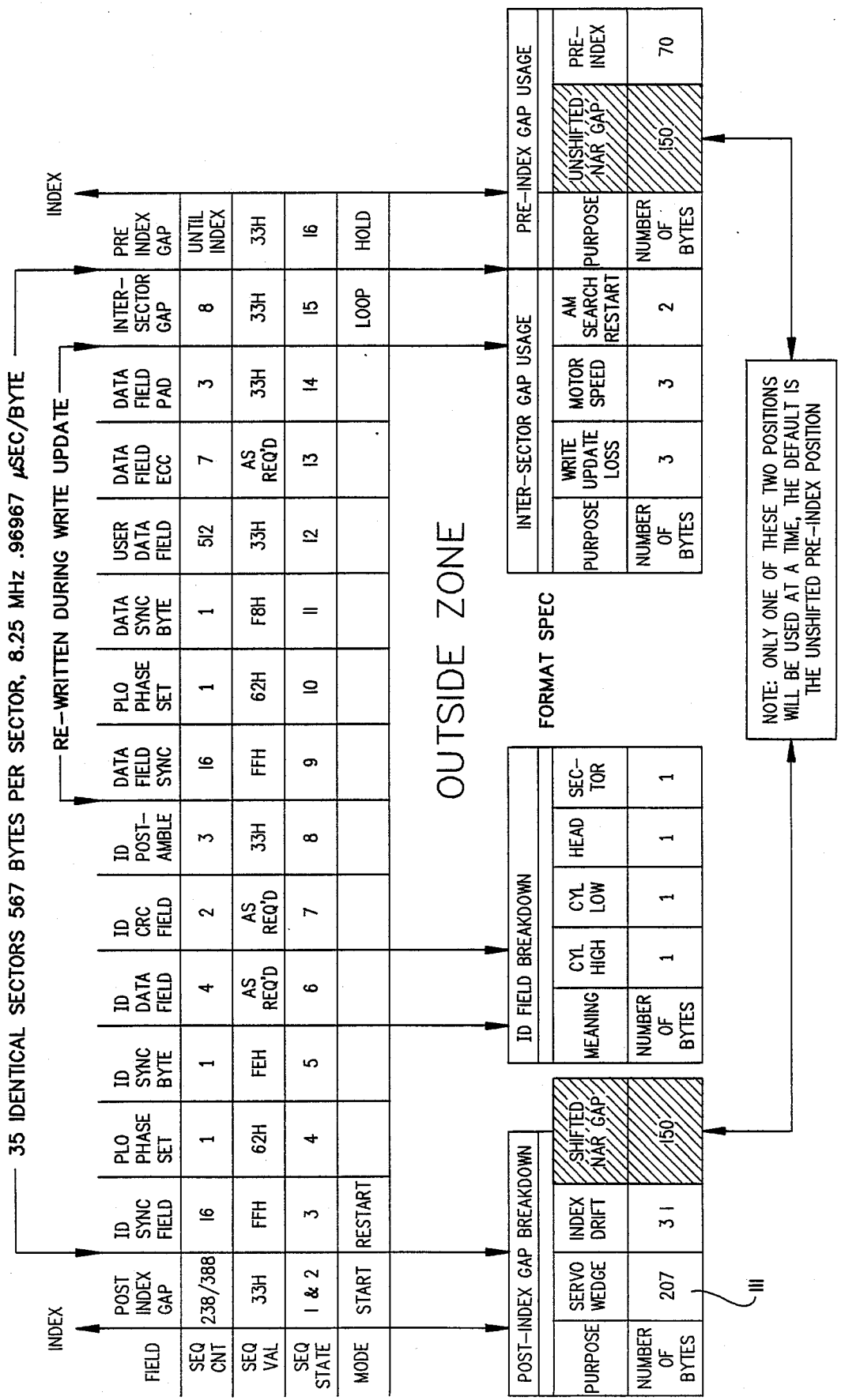
FIG. 3A sets forth a detailed diagram of a sector format for an outside zone of tracks, wherein each track includes 35 identical data sectors.

With reference to FIG. 1A, an outer zone data track 10, one of a multiplicity of such tracks on a data surface of a storage disk of a fixed disk drive of the type described in the referenced U.S. patent application Ser. No. 07/052,709, includes 35 sectors, in accordance with a track format illustrated in FIG. 3A. A 28 sector, inner zone track format is illustrated in FIG. 3B. In the disk drive described in the referenced U.S. Patent Application, preferably there are 416 tracks per data storage surface in the outer zone, and 238 tracks per data storage surface in the inner zone.

Each track, whether within the outer zone or within the inner zone, as exemplified by the track 10 of FIGS. 1 and 2, includes a non-assignable region (NAR) which includes a preamble comprising an identification ("ID") sync field of 16 bytes, a phase lock oscillator phase set byte, an ID sync byte, a sector ID data field of four bytes, an ID cyclic redundancy check field of two bytes and a sector ID postamble of three bytes. The first three fields of the preamble comprise an address mark which signifies to the data sequencer of the disk drive controller that a sector is present. If a media defect appears in this region, it is not possible for the sequencer to recognize the sector as such. As already explained, the prior practice was to map out the entire track, with a concomitant significant loss in data storage capability and/or the requirement that a considerable number of spare tracks be available to handle media defects, or the alternative requirement that the media be rejected as unusable.

It should be noted in FIG. 1A that the physical extent of the NARs for sectors 0, 1 and 2 within track 10 are relatively short, whereas the physical extent of the NARs for sectors 32, 33 and spare (S) are relatively long. This is because of spindle speed variations encountered in production runs of disk drives. (Each spindle motor may rotate the disk at a speed which is slightly variant from nominal spindle speed; this variation is known as the "spindle speed tolerance".)

In the FIG. 1 graph of track 10, a media defect 12 is present. Without practice of the present invention, that defect falls within the NAR for sector 17 and would ordinarily require that the entire track 10 be replaced with a spare track. However, in accordance with the principles of the present invention, a NAR gap 14 is provided within the overall track format, initially at the beginning of the track marked by the internal index clocking signal 16 as shown in FIG. 1A and FIG. 2E. The NAR gap 14 is sized to be sufficiently long to accomodate the longest (i.e. worst case) non-assignable region. In the outside zone of concentric tracks, FIG. 3A, the gap is 150 bytes in length; in the inside zone of concentric tracks, FIG. 3B, the gap is 125 bytes in length, for example.

When the media defect 12 is detected initially to lie within a non-assignable region, such as NAR 17 for original sector 17, the format process, carried out at the factory, or under special format diagnostic routines supplied to the user, reverses the location of NAR gap 14 from the end of the track 10, to the beginning of the track 10, as shown in FIGS. 1B and 2F. This move of the NAR gap 14 effectively moves the media defect 12 out of the non-assignable region NAR 17 and into a data field. While the data field of the particular sector into which the defect 12 is moved is lost to the system, the sector address mark and ID field may still be read and subsequently identified as a defective sector.

In the format process, the single spare sector S provided at the end of each track is pressed into service as sector 33, and the sector having the defect, e.g. original sector 17, is mapped out, with the next occurring sector being identified as sector 17, as shown in FIG. 2F. (Of course, in this example, the interleave of sectors in order to normalize data transfer rates is not taken into account, but would be taken into account in a practical disk drive design.)

Figure 4A:
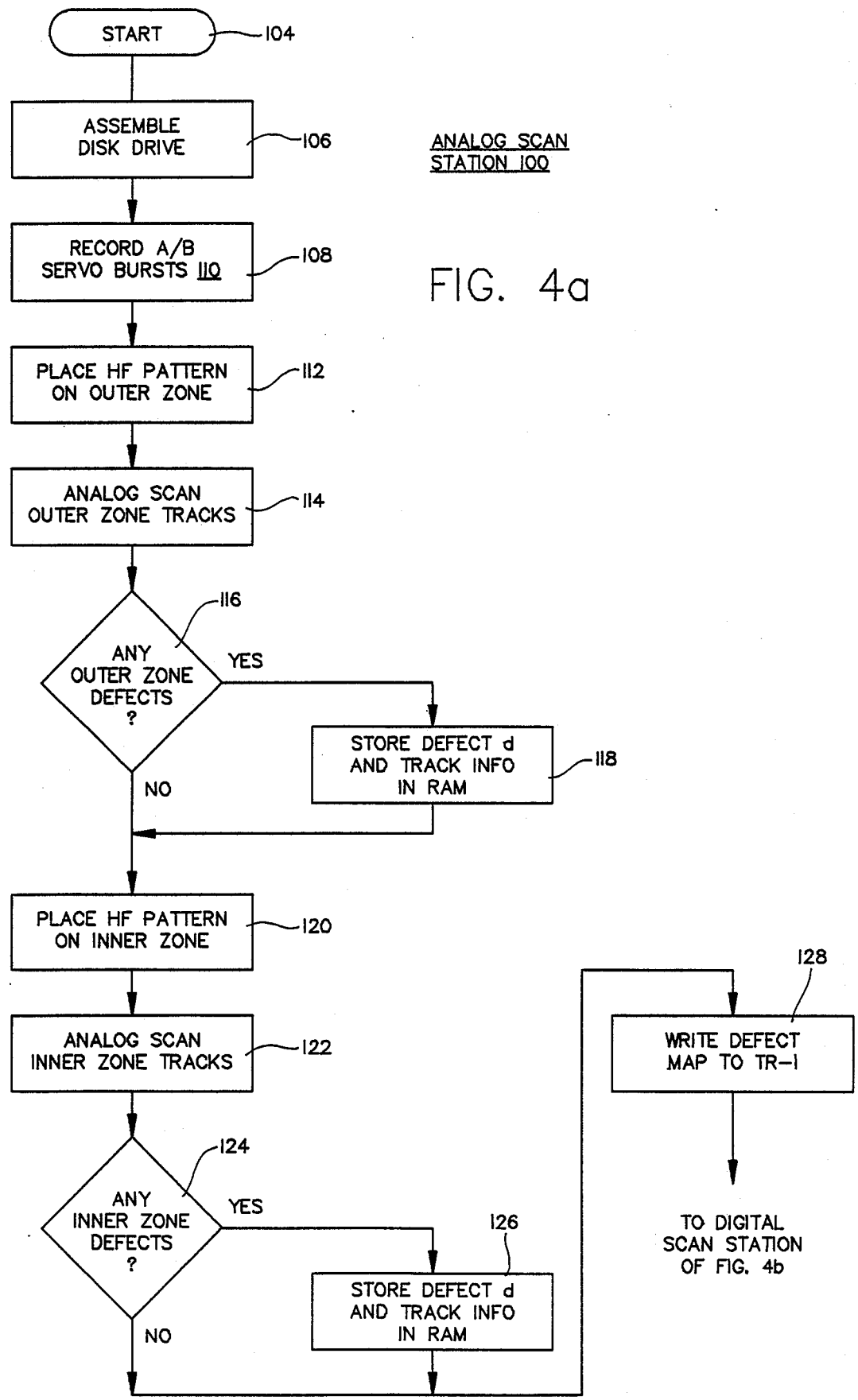

FIG. 4A illustrates operation of an analog scan station 100 within a disk drive assembly or field maintenance depot facility. FIG. 4B illustrates operation of a digital format station 100 which may be within a disk drive assembly or field maintenance depot facility, and which may also be carried out under special software control by the user of the disk drive.

At a start node 104, the components and subassemblies comprising the disk drive are assembled at a step 106 in a clean room or clean tunnel environment, and the head and disk assembly of the disk drive are hermetically sealed into an airtight environment, as by securing a cover over or about the disk drive base casting thereby enclosing the head and disk assembly.

Once assembly and initial checkout is completed, the A/B servo bursts 110 are recorded at a step 108. The servo bursts 110 are time staggered, radially offset bursts of the type illustrated for example in U.S. Pat. No. Re. 32,075, incorporated herein by reference, are recorded in a narrow single servo sector 111 (FIGS. 3A and 3B) marked by the internal index clocking signal 16. These bursts 110 mark electrically the centerline of each data track n, and they are required to be present before any further information is recorded in each track. The representative track 10, as it exists after the step 108, is illustrated in FIG. 2B. A high frequency RF analog signal pattern recorded at a rate related to the nominal data transfer rate for the outer zone is recorded in the tracks of the outer zone at a step 112. In this particular example, the nominal data rate is 8.25 MHz, and an RF carrier related to that frequency is recorded onto the track, as shown in FIG. 2C.

The tracks n of the outer zone are scanned via an analog scan process at a step 114. At this step, drop ins, drop outs, amplitude and phase shifts are monitored, and variances beyond nominal limits are detected.

During the analog scan step 114, if any analog defects are detected, such as the defect 12 shown in FIG. 2C, at a logical step 116, the location of the defect 12, measured by a distance d (which is really a time interval) from the index clocking signal 16 is recorded, together with the track number, in a suitable memory location within a computer associated with the analog scan station 100, at a step 118.

Next, a high frequency RF analog signal pattern is recorded in each track of the inner zone at a step 120. This pattern is related to the nominal inner zone data rate of 6.75 MHz.

At a step 122 an analog scan is performed on the track of the inner data zone. If during that scan step 122 a media defect of the type discussed at step 114 is noted at a logical node 124, the defect distance d and the track number are stored in local memory in the control computer of the analog scan station.

Once all of the tracks have been recorded with a pattern and have been analog scanned for media defects and defects noted in the local memory, a map of media defects is assembled by the control computer of the analog scan station 100 and the map is then written digitally into a special track, track minus one, a track outside of the outermost data track 00 which is reserved for media defect information, at a final step 128. Once this step is completed, the disk drive leaves the analog scan station 100 and moves to the digital format station 102.

Figure 3B:
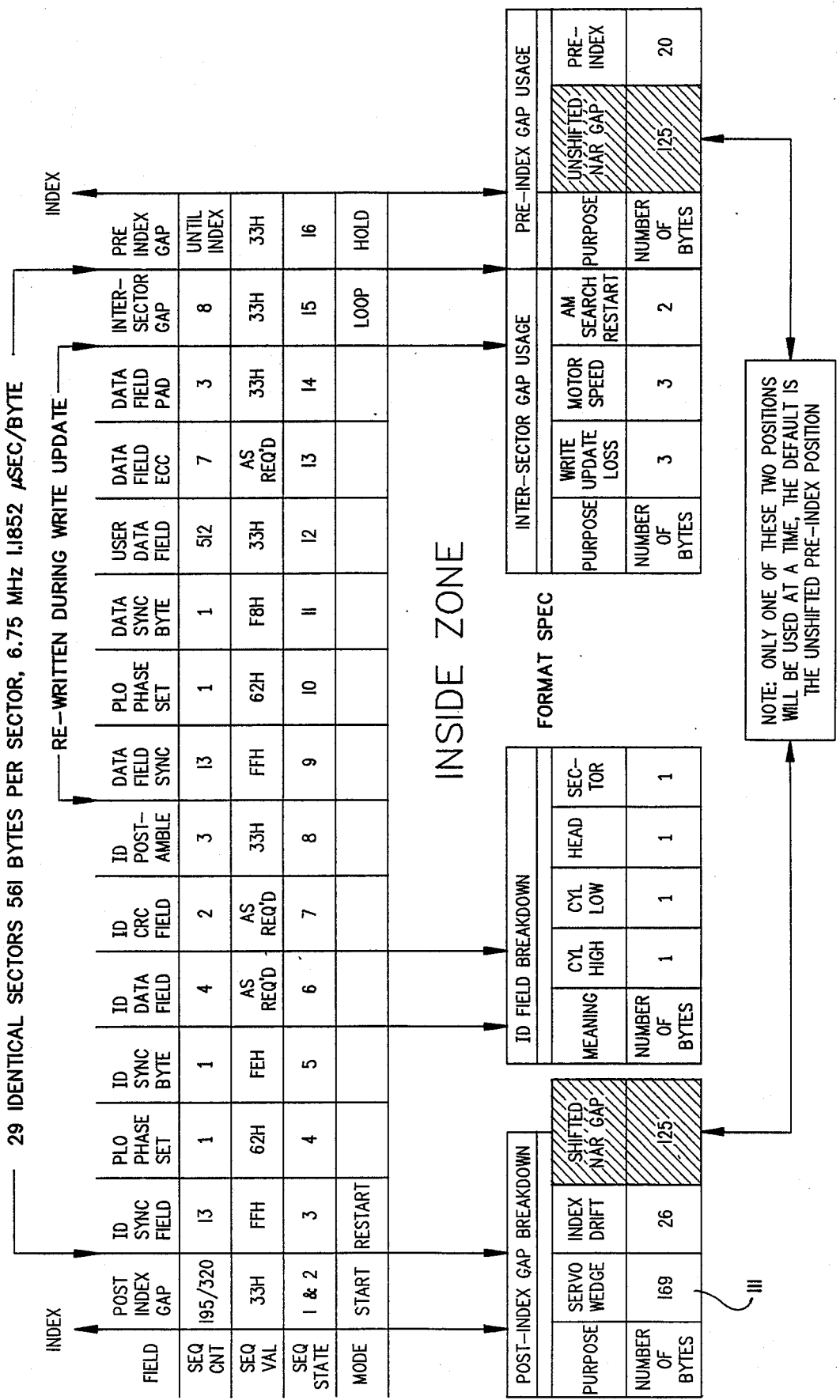
FIG. 3B sets forth a detailed diagram of a sector format for an inside zone of tracks, wherein each track includes 29 identical data sectors.

After a disk drive has arrived at the digital format station 102 (FIG. 4B), each data track of the disk drive is digitally formatted, with each one of the outer tracks being formatted in accordance with the FIG. 3A format, and with each one of the inner tracks being formatted in accordance with the FIG. 3B format, each zone being being recorded at its particular data transfer rate.

In order to carry out the format process, the digital format station 102 first reads the defect map located at track minus one at a step 130 and enters the information thereof into local memory of a computer controller at the digital format station 102. When a particular track is reached, a logical node 132 looks up the defect information for that track and determines whether that particular track contains two or more defects. If so, the track is flagged "bad" at a step 134, and a bad track flag is set into each identification field of each sector header of the track. At the same time, a spare track provided in the disk drive is called into service to replace this bad track which is thereby prevented from user data storage and retrieval service. The process then proceeds to a logical node 136 which determines if this particular track is the last track. If not, a track counter of the digital controller supervising the format station 102 is incremented by one at a step 138, and the process returns to the first format step 130 where the defect map of track n+1 is read into local memory.

If there are not two or more defects in a data track, a logical node 140 tests whether a single defect is present in the track. If not, the track is formatted in conventional fashion at a step 142, a test for last track is carried out at the node 136, and if not, the track counter 138 is incremented at the step 138, and the process repeats.

If there is a single media defect in the track, as tested at the node 140, a table of non-assignable region distances is checked at a node 144, and then the format station tests whether the particular defect lies in a non-assignable region at a logical node 146. If not, a format step 148 formats the track so that the spare sector S effectively replaces the sector having the single media defect, and the process then repeats the last track test at step 136 and if not, returns to step 130. In the track format carried out at step 148, the NAR gap 14 remains at the end of the data track, as illustrated for example in FIG. 2E.

If the test carried forth at step 146 determines that the defect lies in a non-assignable region, then a NAR gap shift format occurs at step 150 in accordance with the principles of the present invention. At this step, the NAR gap 14 is shifted from the end of the data track format to the beginning of the data track format, as illustrated for example in FIG. 2F. When the NAR gap 14 is shifted from the end to the beginning of the format for the track, all subsequently occurring fields are displaced by an amount equal to the length of the NAR gap 14. This shift in fields is effective to move the defect out of a non-assignable region and into a data field or other portion of an adjacent following sector, which is then mapped bad by the format operation carried out at the step 150.

The node 136 then checks to see if the present track is the last track, and if it is, a logical node 152 tests whether there are an excessive number of bad tracks. If so, the particular disk drive is rejected and returned to the assembly line for replacement of the defective data storage disks, or it is scrapped, at a step 154. If the drive has fewer than the maximum specified number of defective tracks, then the format is complete at a step 156. This step 156 completes the operation of the digital format station 102, and the disk drive is then ready for final packaging for shipment to the customer.

It should be understood that the NAR gap 14 may initially be located at the beginning of the data track, as well as at the end. Also, it will be apparent to those skilled in the art that the functions of the digital format station 102 may be carried out by a host computer under program control of a special format utilities program supplied to the ultimate user of the disk drive.

While the present invention has been described in reference to a magnetic disk data storage medium, those skilled in the art will appreciate that the principles hereof apply with equal force to any form of read/write recording media in which data sectors are created within either a single spiral track or within a multiplicity of identically formatted or zone formatted concentric data tracks.

To those skilled in the art to which this invention relates, many changes in construction and widely differing embodiments and applications of the invention will suggest themselves without departing from the spirit and scope of the present invention. The disclosures and the description herein are purely illustrative and are not intended to be in any sense limiting

We claim:

1. A method for managing media defects of a rotating data storage disk drive comprising the steps of:
    providing a narrow gap within a data sector format for a concentric data track of the disk drive wherein the sector format comprises at least one sector having at least one address marker region, the narrow gap being sized in relation to the length of the address marker region;
    detecting the presence of a media defect;
    determining whether a detected defect is located within the address marker region of a sector of the track;
    formatting the data track having no media defect therein lying in an address marker region and positioning said narrow gap at a first predetermined location within said format of the track; and, formatting the data track having a media defect therein otherwise lying within an address marker region and positioning the narrow gap at·a second predetermined location which is different from said first predetermined location of the data track format, thereby shifting the position of said sector within said format by an amount equal to the narrow gap thereby to move the media defect out of the address marker region.

2. The method set forth in claim 1 wherein the data sector format of the track provides a plurality of sectors within the data track, and wherein the narrow gap is sized to accomodate the size of the last address marker region for the last sector, with worst case spindle speed variation tolerance taken into account.

3. The method set forth in claim 2 comprising the further steps of:
    providing a spare sector within the track format and
    mapping out of said format a said sector having a media defect therein and thereupon mapping into said format said spare sector to make up for said mapped out sector having a media defect.

4. The method set forth in claim 3 comprising the further steps of:
    providing a multiplicity of concentric data tracks arranged in a plurality of zones,
    providing said format as a predetermined track format for each one of said zones.

5. The method set forth in claim 4 wherein the step of providing a plurality of zones comprises the step of providing an outer zone and an inner zone, the outer zone having 35 identical data sectors including said spare sector, and the inner zone having 29 identical data sectors including said spare sector.

6. The method set forth in claim 1 wherein the step of detecting the presence of a media defect comprises the further steps of:

providing an index clocking signal to mark the beginning of the data track, recording an RF signal pattern in an unformatted data track at a rate related to the digital data transfer rate, scanning the recorded RF signal pattern to locate a media defect, determining the distance from the index clocking signal to a said defect and storing that distance for said track in active memory as a track defect map.

7. The method set forth in claim 6 further comprising the step of accumulating track defect maps for all tracks and recording the accumulation thereof as a drive defect map on at least one data storage defect map track of the disk drive not ordinarily available for use for storage and retrieval of host system data.

8. The method set forth in claim 7 wherein said data sector formatting steps include the step of reading and deciding the information recorded in said data storage defect map track.

9. The method set forth in claim 7 comprising the further step of providing to a user of the disk drive a utilities formatting routine for operating a host computer in a manner which enables the host computer to access said data storage defect map track and thereupon carry out said soft sector formatting steps.

10. The method set forth in claim 1 wherein said narrow gap is initially located at an end region of the data sector format of the track and is relocated to a beginning region of the data sector format of the track in order to shift a media defect out of an address marker region.

11. A rotating data storage disk for a disk drive characterized by at least one data track having a predetermined data sector format and a narrow gap within said data sector format for said track, wherein the data sector format comprises at least one sector having at least one address marker region, the narrow gap being sized in relation to the length of the address mark region, the narrow gap being normally located in a first region of the track, the narrow gap being relocatable to a second region of the track in order to shift the physical location of the at least one sector relative to the disk so that a media defect otherwise located in said address marker region is thereby shifted to another location of said disk outside of the address marker region of said data sector format.

12. The data storage disk set forth in claim 10 wherein the narrow gap is normally located at a location at the end of a said data track and is relocated to a location at the beginning of said data track so that a media defect may thereby be shifted out of an address marker region within said data format.

13. The data storage disk set forth in claim 11 wherein the data sector format of the track defines a plurality of sectors within the data track, and wherein the narrow gap is sized to accomodate the size of the last address marker region for the last sector, with a worst case spindle speed variation tolerance taken into account.

14. The data storage disk set forth in claim 13 further comprising a spare sector within the track format for replacing a said sector having a media defect therein and a mapping arrangement for mapping said spare sector into said data track format in order to make up for said replaced sector having a media defect.

15. The data storage disk set forth in claim 14 wherein said disk defines a multiplicity of concentric data tracks arranged in a plurality of zones, and said format comprises a predetermined track format for each one of said zones.

16. The data storage disk set forth in claim 15 wherein the data storage disk defines an outer zone of concentric data tracks and an inner zone of concentric data tracks, the outer zone defining 35 identical data sectors including said spare sector, and the inner zone defining 29 identical data sectors including said spare sector.

* * * * *